United States Patent
Morgan

(10) Patent No.: US 10,974,689 B2
(45) Date of Patent: Apr. 13, 2021

(54) BIASING ARRANGEMENT FOR SEATBELT BUCKLE

(71) Applicant: TRW Vehicle Safety Systems Inc., Washington, MI (US)

(72) Inventor: Robert L. Morgan, New Baltimore, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 0 days.

(21) Appl. No.: 16/286,838

(22) Filed: Feb. 27, 2019

(65) Prior Publication Data

US 2020/0269804 A1    Aug. 27, 2020

(51) Int. Cl.
| | | |
|---|---|---|
| *B60R 22/20* | (2006.01) | |
| *A44B 11/25* | (2006.01) | |
| *B60R 22/26* | (2006.01) | |
| *B60R 22/18* | (2006.01) | |
| *B60R 22/02* | (2006.01) | |

(52) U.S. Cl.
CPC .......... *B60R 22/26* (2013.01); *A44B 11/2503* (2013.01); *B60R 22/18* (2013.01); *B60R 22/20* (2013.01); *B60R 2022/021* (2013.01); *B60R 2022/1806* (2013.01)

(58) Field of Classification Search
CPC ......... B60R 22/00; B60R 22/20; B60R 22/22; B60R 22/24; B60R 22/26; B60R 2022/008; B60R 2022/021; B60R 2022/1806; A44B 11/2503; A44B 11/2546
See application file for complete search history.

(56) References Cited

U.S. PATENT DOCUMENTS

| | | | | |
|---|---|---|---|---|
| 4,549,768 A | * | 10/1985 | Fohl | B60R 22/02 24/639 |
| 2010/0314930 A1 | * | 12/2010 | Akaike | A44B 11/2523 297/468 |
| 2013/0341993 A1 | * | 12/2013 | Kennington | B60N 2/2812 297/464 |

(Continued)

FOREIGN PATENT DOCUMENTS

| | | | | |
|---|---|---|---|---|
| DE | 3316608 A1 | * | 11/1984 | B60R 22/22 |
| DE | 3807927 A1 | * | 9/1989 | B60R 22/22 |

(Continued)

OTHER PUBLICATIONS

Machine Translation of EP2127796, https://translationportal.epo.org/emtp/translate/?ACTION=description-retrieval&COUNTRY=EP&ENGINE=google&FORMAT=docdb&KIND=A2&LOCALE=en_EP&NUMBER=2127962&SRCLANG=de&TRGLANG=en; Aug. 31, 2020 (Year: 2020).*

*Primary Examiner* — Ryan D Kwiecinski
(74) *Attorney, Agent, or Firm* — Tarolli, Sundheim, Covell & Tummino LLP

(57) ABSTRACT

A seatbelt arrangement for restraining an occupant of a vehicle in a seat. The seatbelt arrangement has a latch plate and a buckle to which the latch plate can be locked. The buckle includes a housing having a plurality of sidewalls, a biasing member anchor provided on one of the plurality of sidewalls, and a mounting anchor. A mounting member is connected to the mounting anchor. The mounting member secures the buckle to the vehicle. A biasing member is attached to the biasing member anchor. The biasing member biases the buckle to a stowed position when the seatbelt arrangement is unfastened.

14 Claims, 9 Drawing Sheets

(56) References Cited

U.S. PATENT DOCUMENTS

| | | | | |
|---|---|---|---|---|
| 2015/0076806 A1* | 3/2015 | Sucato | .................... | B60R 22/03 |
| | | | | 280/801.1 |
| 2017/0259777 A1* | 9/2017 | Shimizu | .................. | B60R 22/20 |
| 2018/0093597 A1* | 4/2018 | Namboodiri | ............ | B60R 22/26 |
| 2019/0176749 A1* | 6/2019 | Jaradi | ................... | B60R 22/206 |
| 2019/0225185 A1* | 7/2019 | Ohno | ................... | B60N 2/0705 |

FOREIGN PATENT DOCUMENTS

| | | | | |
|---|---|---|---|---|
| EP | 1223087 A1 * | 7/2002 | ......... | A44B 11/2503 |
| EP | 2127962 A2 * | 12/2009 | ............. | B60R 22/18 |
| EP | 2208647 A1 * | 7/2010 | ............. | B60R 22/02 |
| FR | 2408360 A1 * | 6/1979 | ............... | B60N 2/20 |
| FR | 2985698 A1 * | 7/2013 | ............. | B60R 22/18 |
| JP | 2008044515 A * | 2/2008 | | |
| JP | 2010058534 A * | 3/2010 | | |
| JP | 2016128301 A * | 7/2016 | | |
| WO | WO-2004028868 A1 * | 4/2004 | ........... | B60N 2/2806 |
| WO | WO-2007052453 A1 * | 5/2007 | ............. | B60R 22/26 |

\* cited by examiner

BIASING ARRANGEMENT FOR SEATBELT BUCKLE

FIELD OF THE INVENTION

The present invention relates to vehicle safety systems and, in particular, to an arrangement for biasing a buckle of a seatbelt system to a stowed position.

BACKGROUND TO THE INVENTION

It is known to provide a vehicle with a seatbelt arrangement to restrain an occupant in a vehicle seat in the event of collision. A typical 3-point seatbelt arrangement includes a lap belt section and a shoulder belt section formed from a continuous length of webbing. When an occupant is seated in the vehicle seat the lap belt section is configured to extend across the occupant's pelvis and the shoulder belt section is configured to extend across the occupant's upper torso. A latch plate attached to the webbing is received by a buckle to allow the seatbelt arrangement to be fastened for enabling restraint and unfastened to allow entrance and egress from the vehicle.

The vehicle seat can have a seat back that is moveable relative to a seat cushion. This relative movement can be for facilitating access to a desired part of a vehicle or for allowing reconfiguration of an interior space of the vehicle to carry oversized cargo. In such arrangements it can be desirable to prevent the buckle from becoming trapped between the seat back and the seat cushion in order to prevent cosmetic and/or functional damage to the buckle. Furthermore, even in instances where the seat back is fixed in position relative to the seat cushion, it can be desirable to stow the buckle when the seatbelt arrangement is unfastened in order to maintain a neat and orderly appearance of the vehicle interior as well as to prevent the buckle from contacting other vehicle components and potentially generating noise.

SUMMARY OF THE INVENTION

According to one aspect of the invention, a seatbelt arrangement for restraining an occupant of a vehicle in a seat. The seatbelt arrangement has a latch plate and a buckle to which the latch plate can be locked. The buckle includes a housing having a plurality of sidewalls, a biasing member anchor provided on one of the plurality of sidewalls, and a mounting anchor. A mounting member is connected to the mounting anchor. The mounting member secures the buckle to the vehicle. A biasing member is attached to the biasing member anchor. The biasing member biases the buckle to a stowed position when the seatbelt arrangement is unfastened.

BRIEF DESCRIPTION OF THE DRAWINGS

Embodiments of the invention will now be described by way of example only, with reference to the accompanying drawings, in which.

DETAILED DESCRIPTION

Figure 1:
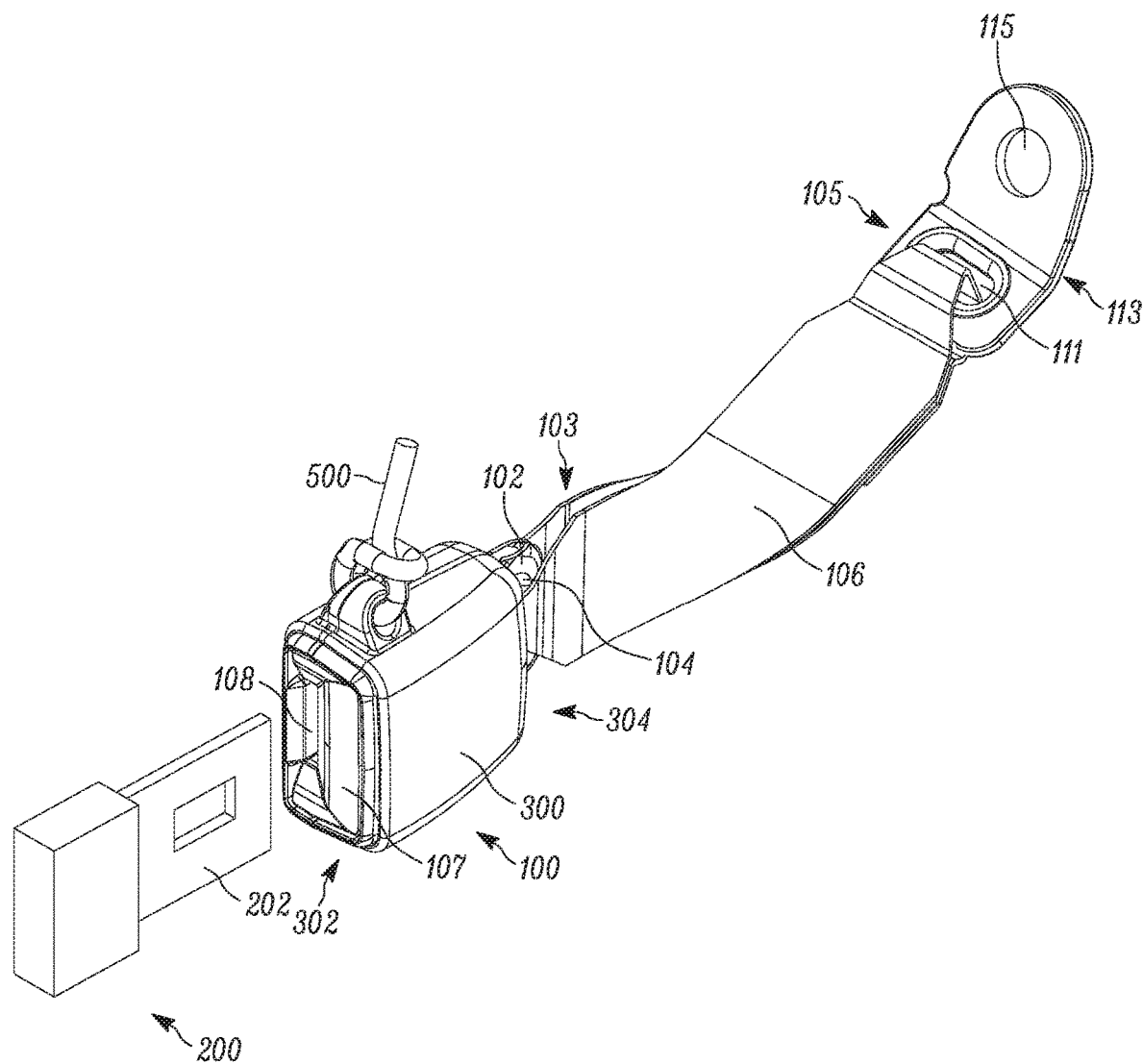
FIG. 1 is a perspective view of a buckle according to one aspect of the invention and a latch plate that can be locked to the buckle.
Figure 2:
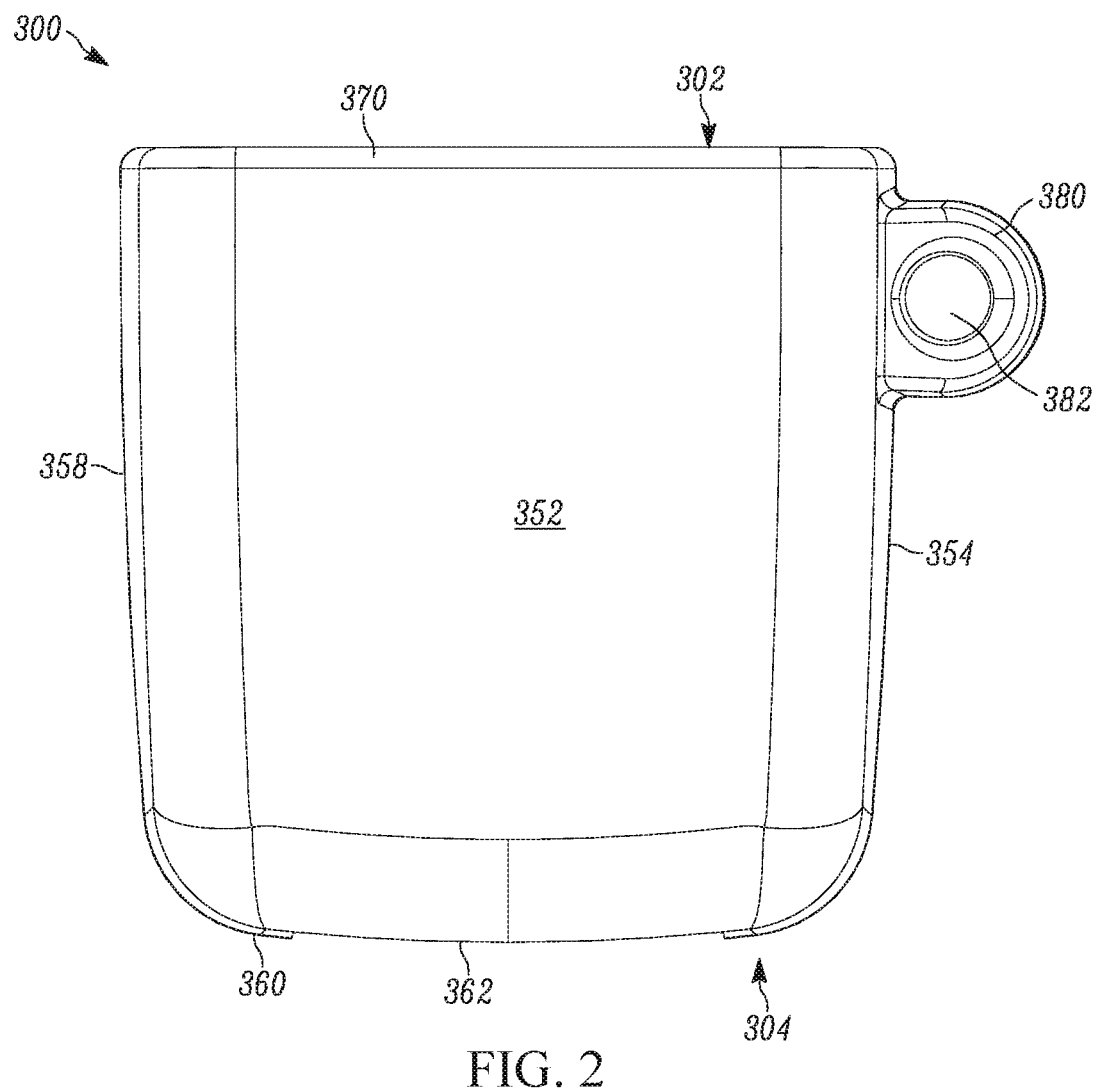
FIG. 2 is a top view of a housing of the buckle of FIG. 1.
Figure 3:
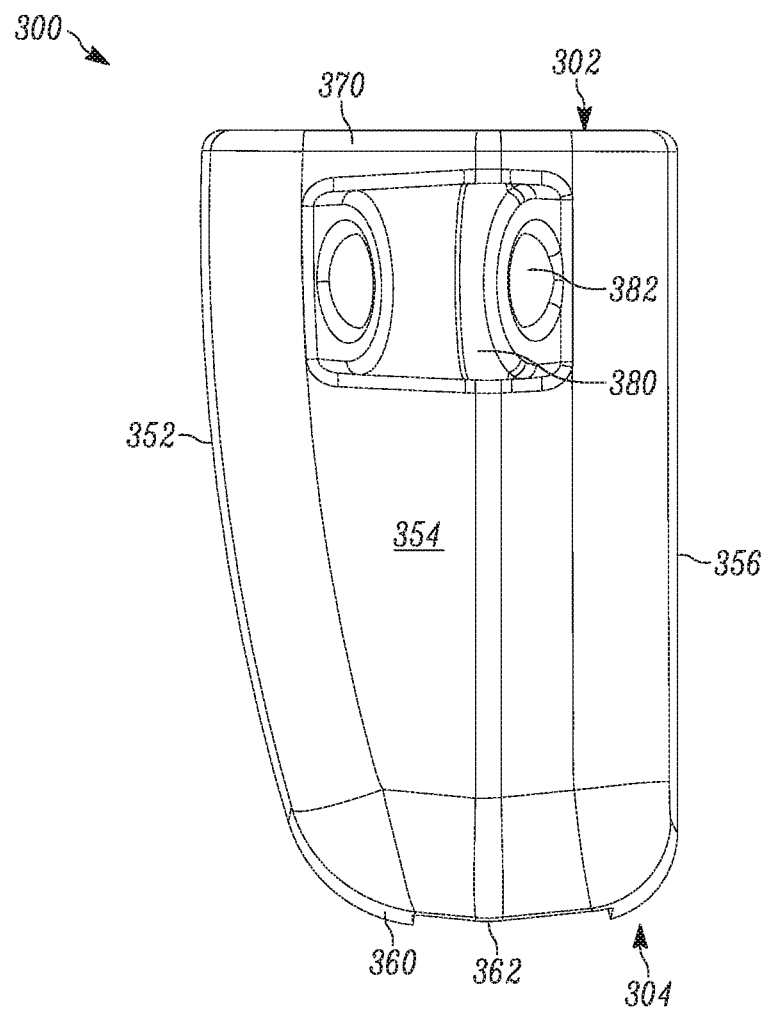
FIG. 3 is a side view of the housing of FIG. 2.
Figure 4:
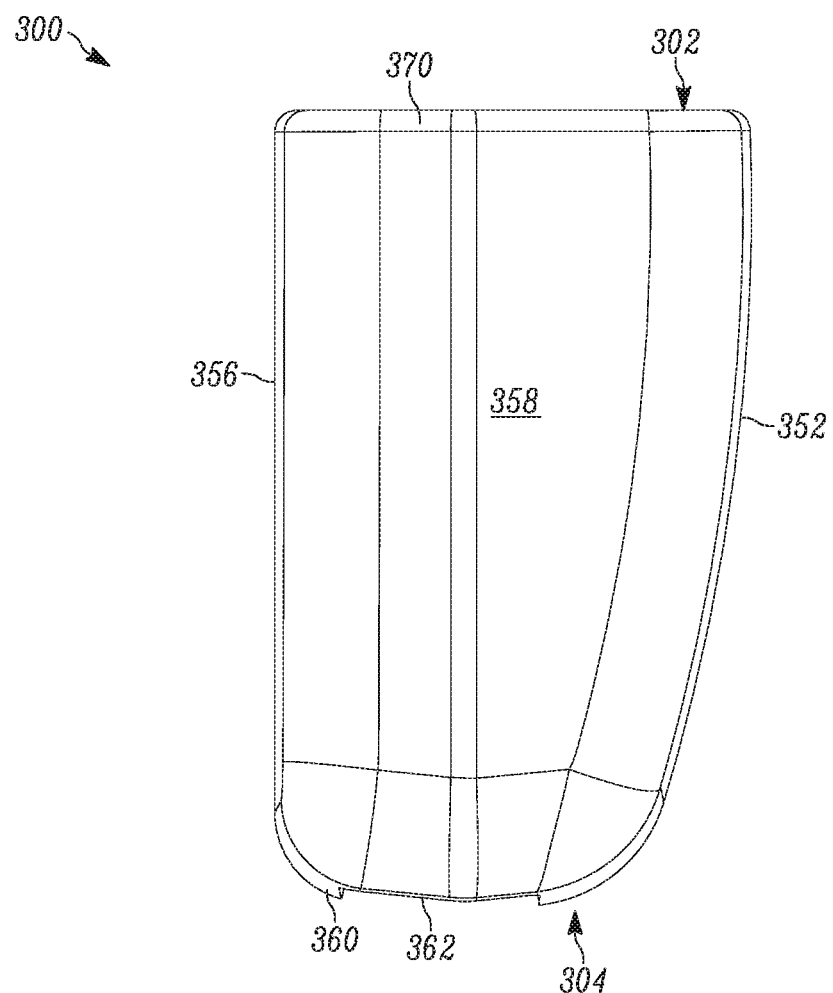
FIG. 4 is another side view of the housing of FIG. 2.
Figure 5:
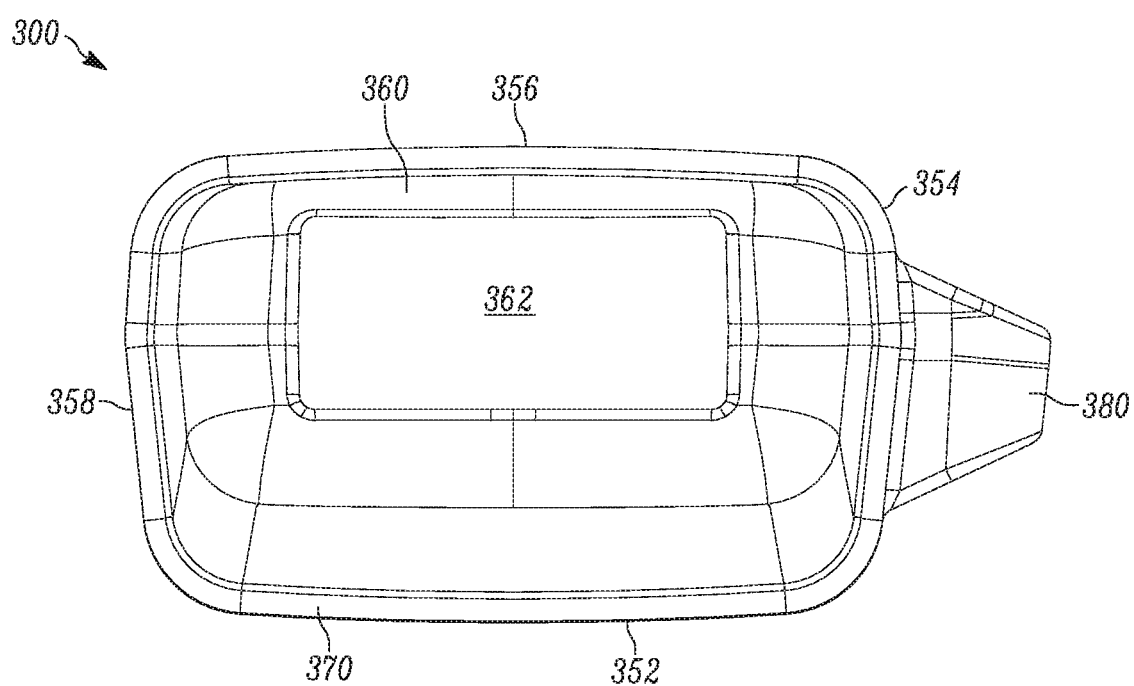
FIG. 5 is an end view of the housing of FIG. 2.

A buckle 100 according to one aspect of the invention and a latch plate 200 useable with the buckle are shown in FIG. 1. The buckle 100 and the latch plate 200 collectively make up part of a seatbelt arrangement. The buckle 100 includes a housing 300 having a first end 302 and a second end 304. A mounting anchor 102 extends from the second end 304 of the housing 300. The mounting anchor 102 can be connected with a frame (not shown) provided in the housing 300 to which various working components of the buckle 100 (e.g., locking mechanism(s), ejection mechanism(s), etc.) can be mounted.

A mounting member 106 is connected to the mounting anchor 102. The mounting member 106 includes a first end 103 and a second end 105. The first end 103 of the mounting member 106 is received by an aperture 104 of the mounting anchor 102. The second end 105 of the mounting member 106 is received by a mounting member aperture 111 of a vehicle mount 113. The vehicle mount 113 includes a fastening aperture 115. The fastening aperture 115 receives a fastener (not shown) for securing the vehicle mount 113 to the vehicle, thus securing the buckle 100 to the vehicle. In one example, the mounting member 106 is webbing. However, it is contemplated that the mounting member 106 can be any desired arrangement that secures the buckle 100 to the vehicle. Additionally, it is contemplated that the buckle 100 can be secured to the vehicle without the use of the vehicle mount 113 (i.e., the second end 105 of the mounting member 106 is secured directly to the vehicle).

A release button 107 is provided at the first end 302 of the housing 300. The release button 107 cooperates with the housing 300 to define a slot 108 into which a tongue 202 of the latch plate 200 can be inserted. Upon insertion of the tongue 202 into the slot 108, locking mechanism(s) (not shown) provided in the housing 300 retain the tongue 202 in the slot 108 to lock the latch plate 200 to the buckle 100. The release button 107 is moveable relative to the housing 300 to actuate ejection mechanism(s) (not shown) provided in the housing 300 to release the latch plate 200 from the buckle 100 and eject the tongue 202 from the slot 108.

The housing 300 (FIGS. 2-5) includes a plurality of sidewalls 352, 354, 356, 358. In one example, the housing 300 includes opposed first and second major sidewalls 352, 356 and opposed first and second minor sidewalls 354, 358. However, it is contemplated that the housing 300 can include as many sidewall(s) as desired. An end wall 360 extends from the sidewalls 352, 354, 356, 358 at the second end 304 of the housing 300. The end wall 360 includes a through-hole 362. The mounting anchor 102 extends through the through-hole 362. A flange 370 extends from the sidewalls 352, 354, 356, 358 at the first end 302 of the housing 300.

Figure 9:
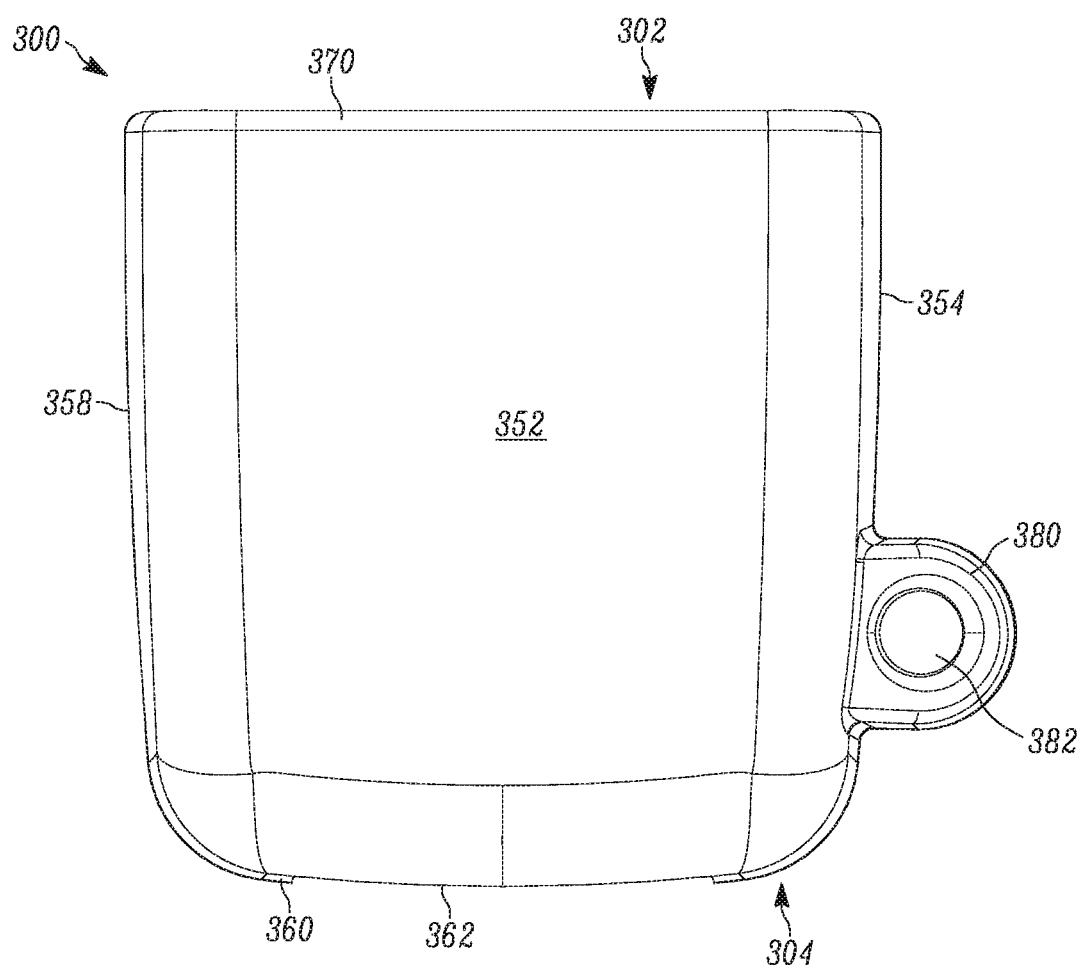
FIG. 9 is a top view of an alternative housing for the buckle of FIG. 1.

The housing 300 includes a biasing member anchor 380. In one example, the biasing member anchor 380 is provided on and integrally formed with the first minor sidewall 354 adjacent the first end 302 of the housing 300. However, it is contemplated that the biasing member anchor 380 can be provided on any desired sidewall at any desired location. For example, as shown in FIG. 9, the biasing member anchor 380 can be provided on the first minor sidewall 354 adjacent the second end 304 of the housing 300. Additionally, it is contemplated that the biasing member anchor 380 can be separately formed and subsequently attached to the housing 300.

The biasing member anchor 380 includes an aperture 382 for receiving a biasing member 500 (FIG. 1). As will be explained below, the biasing member 500 biases the buckle 300 to a stowed position. In one example, the biasing member 500 is an elastic band. However, it is contemplated that the biasing member 500 can be any desired arrangement that biases the buckle 300 to a stowed position.

Figure 6:
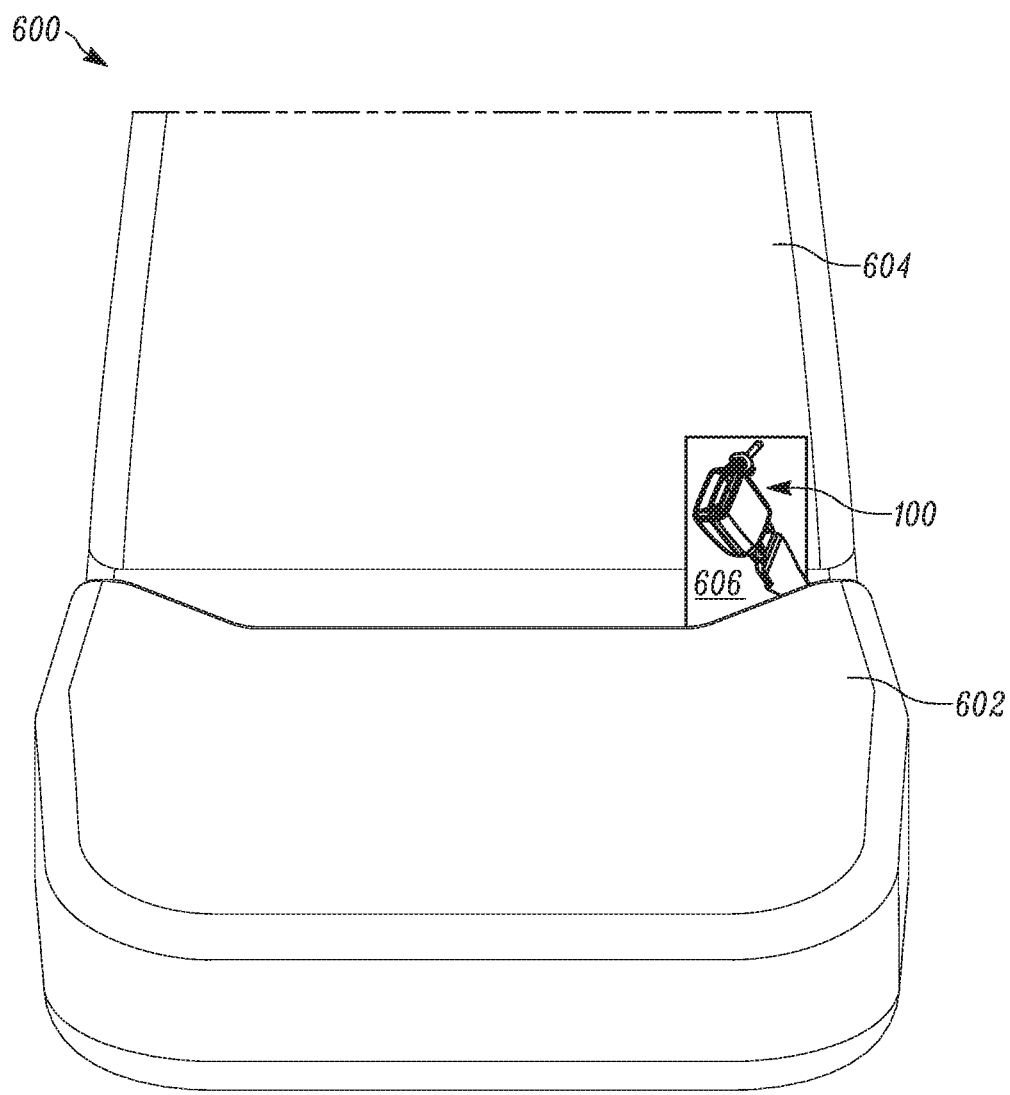
FIG. 6 is a front view of a vehicle seat provided with the buckle of FIG. 1.
Figure 7:
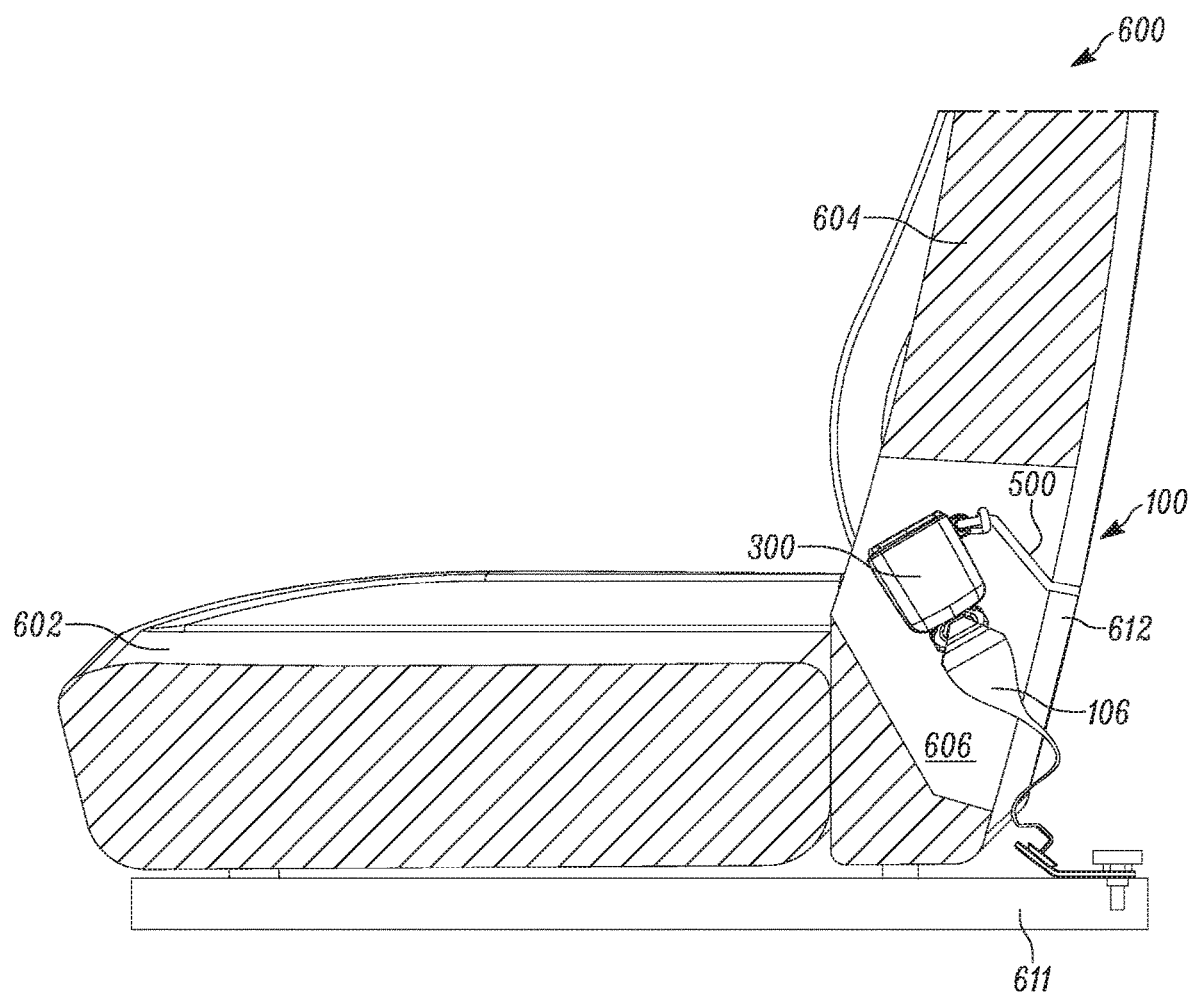
FIG. 7 is a side view of FIG. 6 with the vehicle seat partially in section showing the buckle in a stowed position.
Figure 8:
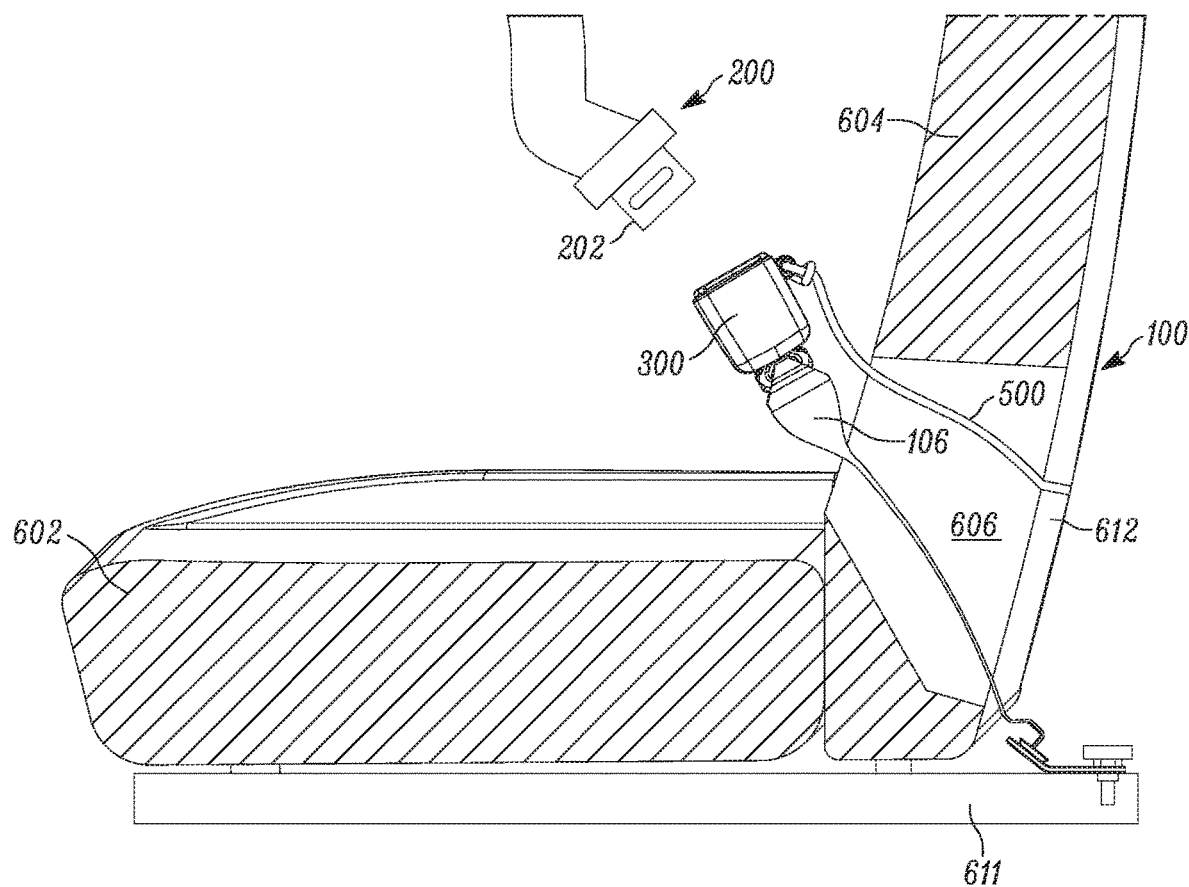
FIG. 8 is a side view of FIG. 6 with the vehicle seat partially in section showing the buckle in a unstowed position.

A vehicle seat 600 provided with the buckle 100 is shown in FIGS. 6-8. The seat 600 includes a seat cushion 602 and a seat back 604 mounted on a frame 612 secured to the vehicle floor 611. The biasing member 500 is attached to a seat frame 612. However, it is contemplated that the biasing member 500 can be attached to any desired part of the vehicle. A cavity 606 is provided in the seat back 604. The seat back 604 and the seat cushion 602 are moveable relative to one another to facilitate access to a desired part of a vehicle or to allow reconfiguration of an interior space of the vehicle to carry oversized cargo, for example.

The buckle 100 is moveable relative to the cavity 606 between a stowed position (FIG. 7) and an unstowed position (FIG. 8). In the stowed position the buckle 100 is fully or at least substantially received within the cavity 606. Characteristics of the biasing member 500 (e.g., length, Young modulus, etc.) can be selected to ensure that that the buckle 100 remains in the cavity 606 in the stowed position when the seatbelt arrangement is unfastened. When it is desired to fasten the seatbelt arrangement the buckle 100 can be moved out of cavity 606 against the biasing force of the biasing member 500 to the unstowed position to facilitate insertion of the tongue 202 into the slot 108. When the seatbelt arrangement is unfastened the buckle 100 automatically returns to the stowed position in the cavity 606 due to the biasing force of the biasing member 500.

The location of the buckle 100 in the cavity 606 reduces the chance of the buckle 100 becoming trapped and/or damaged between the seat back 604 and the seat cushion 602 during relative movement between the seat back 604 and the seat cushion 602. Furthermore, locating the buckle 100 in the cavity 606 when the seatbelt arrangement is unfastened maintains an orderly appearance of the vehicle interior and reduces the possibility of the buckle 100 coming into contact with other vehicle components and potentially generating undesired noise.

What have been described above are examples of the disclosure. It is, of course, not possible to describe every conceivable combination of components or methods for purposes of describing the disclosure, but one of ordinary skill in the art will recognize that many further combinations, permutations, and variations of the disclosure are possible. For example, the specific shape of the housing 300 can be varied from the one shown in the figures. As another example, the cavity 606 can have any desired shape and be provided at any desired location on the seat 600. As yet another example, the biasing member anchor 380 and the biasing member 500 concepts can be applied to seatbelt arrangements other than the one described above. Furthermore, the biasing member anchor 380 and the biasing member 500 concepts can be applied to seats that are free from any cavity. Accordingly, the disclosure is intended to embrace all such alterations, modifications, and variations that fall within the scope of this application, including the appended claims.

The invention claimed is:

1. A seatbelt arrangement for restraining an occupant of a vehicle in a seat, the seatbelt arrangement comprising:
a latch plate;
a buckle to which the latch plate can be locked, the buckle including a housing having a plurality of sidewalls, a biasing member anchor provided on one of the plurality of sidewalls on the exterior of the housing and comprising a projection having an aperture, and a mounting anchor;
a mounting member connected to the mounting anchor, the mounting member securing the buckle to the vehicle; and
a biasing member extending through the aperture of the biasing member anchor, the biasing member biasing the buckle to a stowed position when the seatbelt arrangement is unfastened.

2. The seatbelt arrangement according to claim 1 wherein the buckle is configured to be received within a cavity of the seat when the buckle is in the stowed position.

3. The seatbelt arrangement according to claim 1 wherein the buckle is configured to be received within a cavity in a seat back of the seat.

4. The seatbelt arrangement according to claim 1 wherein the biasing member is an elastic band.

5. The seatbelt arrangement according to claim 1 wherein the biasing member anchor is formed integrally with the one of the plurality of sidewalls.

6. The seatbelt arrangement according to claim 1 wherein the buckle housing includes a first end and a second end opposite the first end, the latch plate having a tongue that is insertable into the first end of the buckle housing, the biasing member anchor being closer to the first end of the buckle housing than the second end.

7. The seatbelt arrangement according to claim 6, wherein the mounting anchor extends from the second end of the buckle housing.

8. The seatbelt arrangement according to claim 1 wherein the buckle housing includes a first end and a second end opposite the first end, the latch plate having a tongue that is insertable into the first end of the buckle housing, the biasing member anchor being adjacent the second end of the buckle housing.

9. The seatbelt arrangement according to claim 8, wherein the mounting anchor extends from the second end of the buckle housing.

10. The seatbelt arrangement according to claim 1 wherein the buckle includes a release button, the release button cooperating with the housing to define a slot into which a tongue of the latch plate can be inserted.

11. The seatbelt arrangement according to claim 10 wherein the buckle housing includes a flange that extends from the plurality of sidewalls.

12. The seatbelt arrangement according to claim 1 wherein the buckle is configured for securing to the vehicle and wherein the biasing member is configured for attaching to a seat frame.

13. The seatbelt arrangement according to claim 1 wherein the mounting member is webbing.

14. The seatbelt arrangement according to claim 1 wherein the biasing member is free of direct connection to the mounting anchor.

* * * * *